May 5, 1942.  W. L. BROWN  2,281,671
GAS METER
Filed March 6, 1940   3 Sheets-Sheet 1
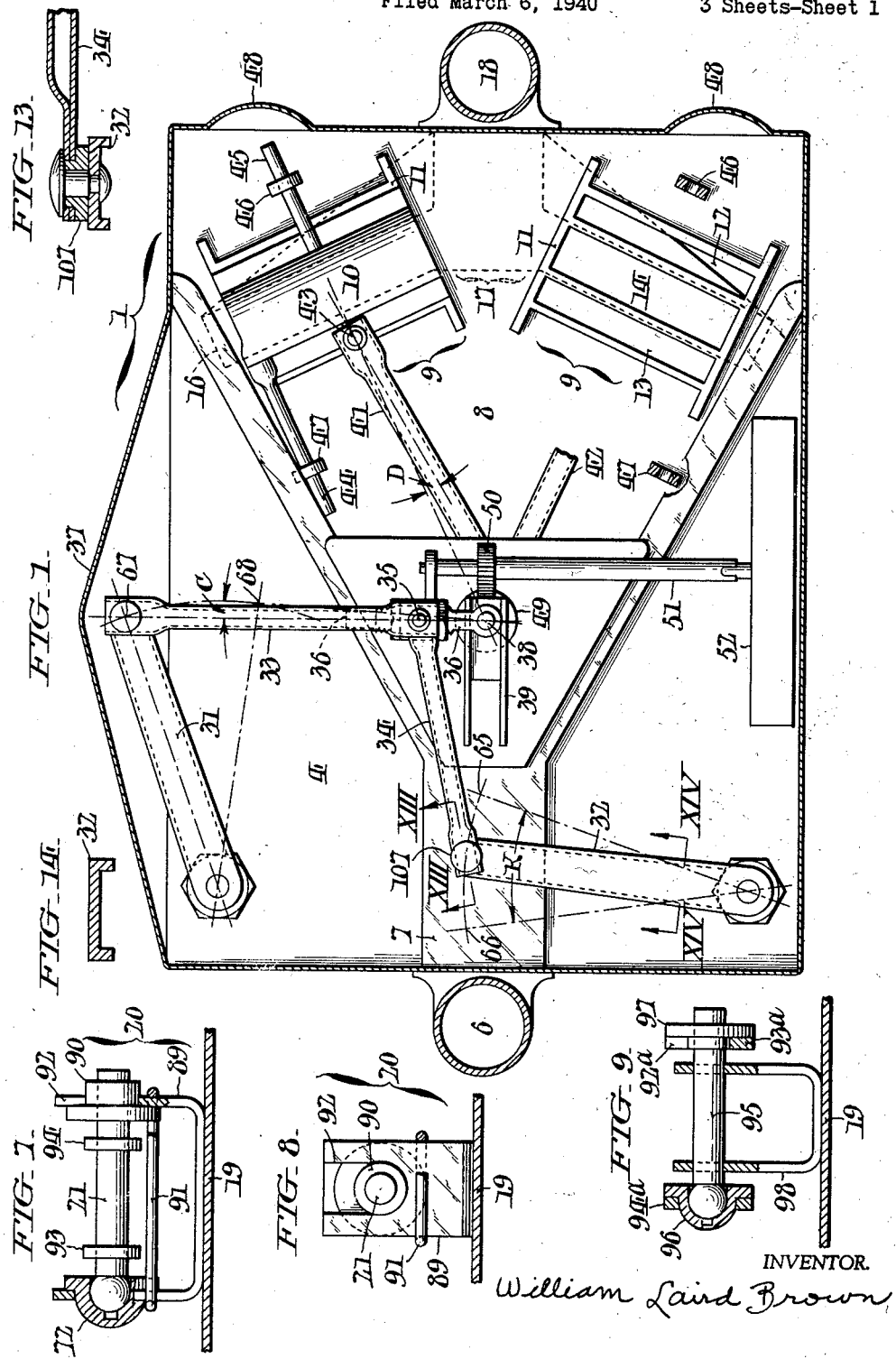
INVENTOR.
William Laird Brown

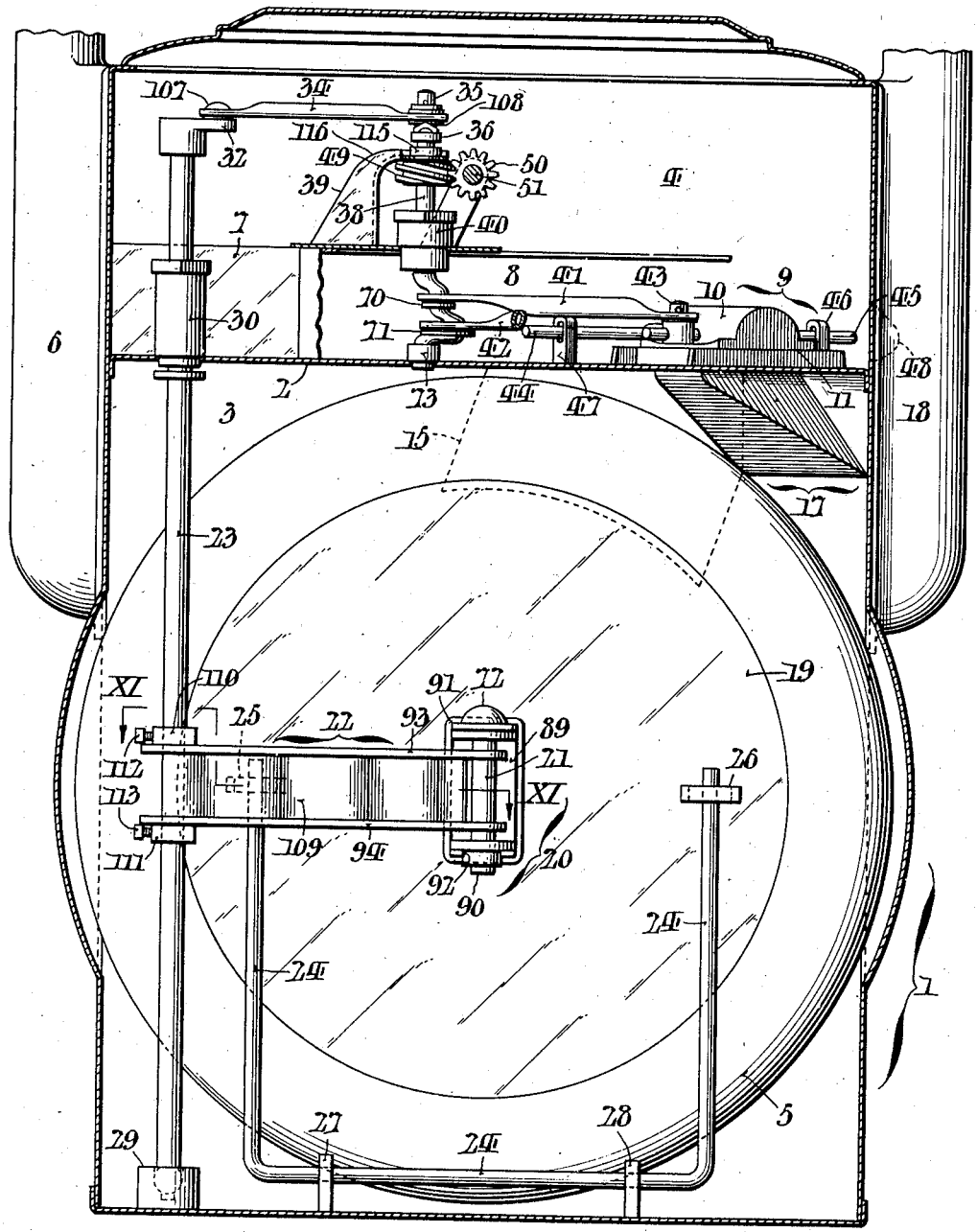

May 5, 1942.     W. L. BROWN     2,281,671
GAS METER
Filed March 6, 1940     3 Sheets-Sheet 3
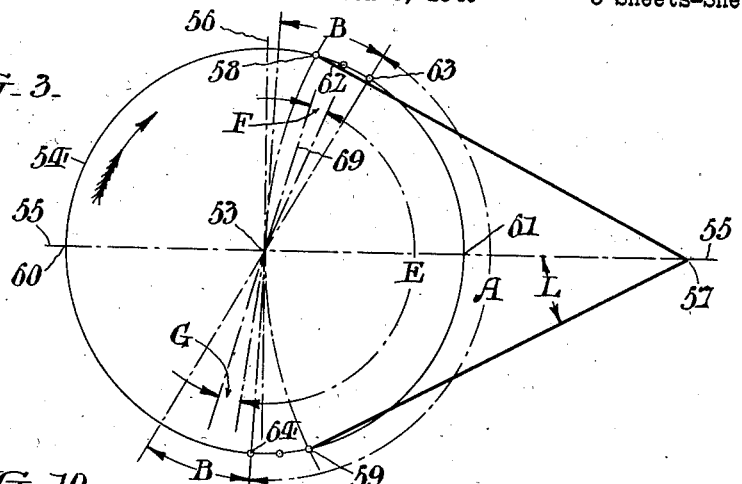
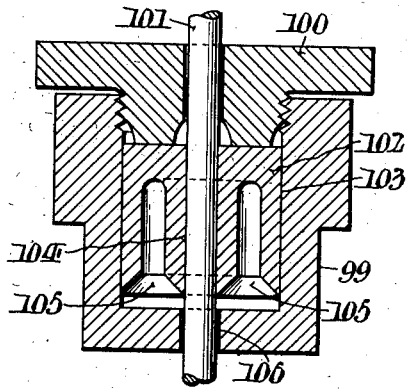
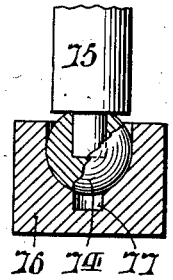
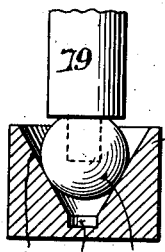
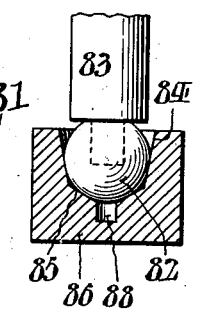
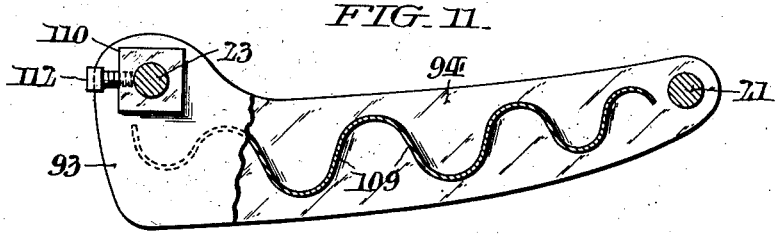
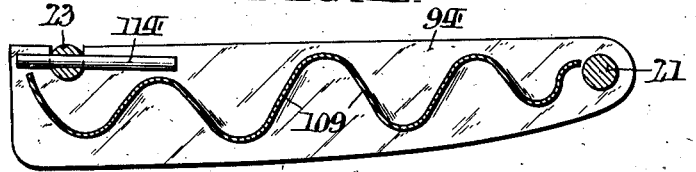
INVENTOR.
William Laird Brown Patented May 5, 1942

2,281,671

UNITED STATES PATENT OFFICE 2,281,671

GAS METER

William Laird Brown, Lansdowne, Pa.

Application March 6, 1940, Serial No. 322,432

24 Claims. (Cl. 73—268)

This invention relates to meters; and in the exemplification hereinafter described is applied to a gas meter of the positive displacement type. In the meter shown, the gas traverses a pair of opposing bellows, which, through flags and flag rods, actuate a linkage mechanism whereby a tangent arm is rotated, said tangent arm being secured to a valve crank shaft by which slide valves are reciprocated to control admission of gas to and from the bellows.

My invention has for one of its aims to increase meter capacity for a given speed and given size of case, and at the same time to reduce irregularities of meter movement to insure the delivery of gas with smaller fluctuations in outlet pressure than obtain in ordinary meters. These objects I realize through improved proportioning and arrangement of the linkage mechanism and the slide valves, as hereinafter more fully described.

Another object of my invention is to provide a meter of small size and moderate cost, which, by operation at increased speed, will have a greater capacity than an ordinary meter of the same size; and to attain this advantage with prevention of excessive wear, frictional resistance, and fluctuations in outlet pressure, which increased speed entails in ordinary meters. This general object is attained, first, by providing improved bearings as set forth in the paragraph immediately following; and, second, by reducing the weight of certain moving parts without detracting from the necessary strength and stiffness, as set forth in the next paragraph but one.

Under this general object, I have provided a step bearing for each flag rod to cooperate with a single ball fast to the rod; a like bearing and ball for the valve crank shaft; and a single ball fast to each rock shaft, a bearing therefor, and two alternative constructions for the co-acting flag carriage.

I have also provided a built-up flag considerably lighter, for a given stiffness, than the ordinary flag, shown in alternative embodiments.

Attainment of the general object of increasing meter speed, while maintaining satisfactory operation, will obviously reduce the cost of a meter of given capacity.

In order to condense the foregoing list of the objects of my invention, the effect on meter operation of wear and weight of moving parts under relatively high speed has not been discussed, but will be explained at length hereunder.

Other objects and attendant advantages will appear from the following description of the attached drawings, wherein Fig. 1 is a staggered horizontal section of a gas meter conveniently embodying the present improvements, viewed from above, with certain parts broken out or removed to expose important parts that would otherwise be hidden;

Fig. 2, a staggered longitudinal section of the meter viewed from the front, with certain parts broken out or removed;

Fig. 3, a schematic diagram, in plan, of the valve crank shaft and the crank arm;

Figs. 4, 5, 6 show balls fast to the ends of shafts, with alternative forms of bearings in vertical section;

Fig. 7 is a side view, partly in section, of the rock shaft and flag carriage shown in Fig. 2;

Fig. 8, a view from below of the rock shaft and flag carriage shown in Fig. 2;

Fig. 9, a side elevation, partly in section, of an alternative form of my flag carriage;

Fig. 10, a cross sectional elevation of my improved stuffing box;

Fig. 11, a plan view of the flag shown in Fig. 2, in cross section as indicated by the arrows XI—XI;

Fig. 12, a sectional plan view of a modification of my improved flag alternative to that shown in Fig. 11;

Fig. 13, a vertical section of a part of my improved link, and its connection to the flag arm, as indicated by the arrows XIII—XIII of Fig. 1;

And Fig. 14, a cross section of one form of my improved flag arm as indicated by the arrows XIV—XIV of Fig. 1.

The gas meter herein delineated for convenience of exemplifying my invention is generally of well known construction, having a generally rectangular casing 1, with a horizontal partition or valve table 2 setting apart a comparatively high lower compartment 3 and a shallower upper compartment 4. The lower compartment 3 is in turn sub-divided by a central longitudinal partition into two chambers for the two bellows 5 of the meter. Leading from the gas inlet 6 is a channel 7, in this instance above the valve table 2, by which gas is conducted to a valve box 8 containing the valves 9 whereby the admission of the gas to and from the bellows 5 is controlled. Gas may be conducted from the inlet 6 to the valves 9 otherwise than herein shown by way of example, without affecting the advantages of my invention. Each of the valves 9 comprises a cover 10 which moves back and forth over a seat 11 to connect the outer ports 12 and 13 alternately with the center port 14, port 14 being separated from ports 12 and 13 by crossbars. The diaphragm ports 13 communicate respectively with the inside of the bellows 5 through channels as instanced by dotted lines at 15 in Fig. 2; while the case ports 12 communicate respectively with the outsides of the bellows. The center ports 14 lead into the branches 16 of a fork channel 17, by which gas is conducted to the outlet 18.

Each bellows 5 carries a disc 19, the motion of which, by a flag carriage 20, a rock shaft 21, and a flag 22, is transmitted to the flag rod 23. A disc guide wire 24, sliding in disc guides 25, 26, which are fast to the disc 19, insures that the various positions of the disc during its travel shall be substantially parallel to each other, said disc guide wires being journalled in disc guide wire bearings 27, 28 fixed to the meter bottom.

The flag rods 23 are journalled at the bottom in the flag rod bearing 29, and extend into the upper compartment 4 through the gas tight flag stuffing boxes 30. Affixed to the upper ends of the flag rods 23 are flag arms 31, 32, which, through links 33, 34 of unequal lengths are connected to the tangent post 35 on the tangent arm 36. The bulge 37 in the rear meter casing wall provides room for the movement of the rear flag arm 31. The tangent post 35 is adjustable along the threaded portion of the tangent arm 36, and is fixable in adjusted position by jam nuts as usual. The tangent arm 36 is adjustably fixed to the valve crank shaft 38, which is journalled near its upper end in the kingpost 39. The valve crank shaft 38 passes through the gas tight crank stuffing box 40 into the valve box 8, there reciprocating the valve covers 10 on the seats 11 by means of crank arms 41, 42, connected to valve wrists 43. The valve covers 10 are confined to straight line motion by valve guide wires 44, 45 engaging valve guides 47, 46, room for motion being given by bulges 48. By positioning the valve seats 11 closer to the valve crank shaft 38, the bulges 48 may of course be omitted. Worm 49, fast to valve crank shaft 38, drives the index, indicated in outline at 52, through axle wheel 50, and axle 51, in the usual manner.

The refinements which I have made for the attainment of the important practical advantages hereinbefore pointed out are as follows:

It is first necessary to point out the irregularity of valve cover motion arising from the angularity of the valve crank. Fig. 3 diagrammatically represents a plan of the movement of the valve crank shaft in a meter of the type described, wherein the point 53 is the position of the vertical valve crank shaft axis, the circle 54 represents the path of the axis of the valve crank bearing, rotating clockwise as marked by the arrow, the line 55 is one axis of valve cover motion; while line 56 is drawn through point 53 at right angles to line 55. Point 57 represents the valve wrist (corresponding to 43 of Fig. 1) at a position hereafter defined, and lines 57—58 and 57—59 are respectively two positions of the crank arm (corresponding to 41 of Fig. 1). The diameter of the circle 54, in proportion to the length of the crank arm 57—58, is exaggerated as compared to the proportions employed in practice, to show more clearly the irregularity of motion under discussion. Lines 57—58, 57—59, and 57—53 are equal in length, an arc drawn from point 57 as a center passing through points 58, 53, and 59 as shown.

Full port opening will be secured when the valve cover edge nearest the valve crank shaft 38 (Fig. 1) is directly over the inner edge of diaphragm port 13 at one end of the stroke, and when the valve cover edge furthest from the valve crank shaft is directly over the inner edge of the case port 12 at the other end of the stroke. In Fig. 3, disregarding valve cover lap and lost motion for the moment, this effect of full port opening will be secured when, with case and diaphragm ports equal in width, with the valve cover in mid-position sealing both case and diaphragm ports, and with the valve wrist at point 57, the length of the crank arm is equal to the distance 57—53, so that the extreme travel of the valve cover will be the same in both directions from the position shown; the total travel being equal to the diameter of the circle 54, and the valve crank bearing axis at extreme positions of the valve cover being at 60 and 61 respectively. As specified above, Fig. 3 has been laid out to these conditions.

With this setting of the valve cover, admission on the diaphragm port (corresponding to 13 of Fig. 1) would take place when the valve crank bearing axis reaches point 58, the valve cover with the wrist at point 57 being at seal position (still disregarding valve cover lap and lost motion). Admission on the case port (corresponding to 12 of Fig. 1) would take place at 59.

Actually admission will take place on the diaphragm port when the valve crank bearing axis has moved beyond 58 by a distance 58—63, made up of a movement 58—62 corresponding to lost motion in the bearings, and a distance 62—63 necessary to move the valve cover by the amount of the lap. Likewise admission on the case port will occur beyond 59, when the valve crank bearing axis reaches point 64, corresponding to point 63 for the diaphragm port. Thus the admission points for the two outer ports would be distant from each other by the angle A, differing from 180 degrees by the angle B. In an actual meter, with the ratio of crank arm length to crank throw considerably greater than in Fig. 3, the movements of the valve cover corresponding to the arcs 58—63 and 59—64 respectively will be practically equal, so that the angle between admission positions (corresponding to angle A) will be practically equal to angle 58—53—59. Likewise the angles between the crank arm and the axis of valve cover motion when the valve cover is in admission positions, in an actual meter, will both be nearly equal to an angle corresponding to the angle L of Fig. 3, given the usual small valve cover lap and small lost motion.

Now it is desirable, for meter accuracy at various rates of flow, for steadiness of outlet pressure, and for smoothness of meter operation, to arrange valve cover admission at or close to the instant when the co-acting disc is at the end of its stroke. For the present purpose, the following three methods of accomplishing this, all of prior record, are set down:

(X) In my co-pending application 291,843, filed Aug. 25, 1939, lines drawn from the extreme positions of either flag arm bearing axis (said positions corresponding to 65 and 66 of Fig. 1 for the front flag arm, and to 67 and 68 for the rear flag arm) to the vertical valve crank shaft axis, form an angle equal to the angle derived from actual meter dimensions corresponding to angle B of Fig. 3; so that admission points synchronize with the ends of the disc strokes, case and diaphragm ports being equal in width, and valves set for full port opening without wipeover.

This arrangement requires links 33 and 34 of different lengths.

(Y) In my co-pending application 238,133, filed Nov. 1, 1938, a line drawn through the extreme positions of either flag arm bearing axis passes through the vertical valve crank shaft axis, so that the positions of the tangent arm, for two extreme positions of the co-acting disc, are 180 degrees apart; while the positions of the valve crank bearing axis for the two admission positions of the co-acting valve cover are arranged to be 180 degrees apart by making the width of the diaphragm port greater than the width of the case port, at the same time giving full port opening at the end of each valve cover stroke, without wipeover, for admission of gas through both case and diaphragm ports; by which admission points synchronize with the ends of the disc strokes.

(Z) In the ordinary meter, the irregularity of movement shown by Fig. 3 is usually compensated for by shifting the wrist (corresponding to 43 of Fig. 1) towards the crank arm (or, which amounts to practically the same thing, by lengthening the crank arm) until the admission points, corresponding to 63 and 64 of Fig. 3, are both on one diameter of the crank circle 54, as might be on the diameter 69. This will bring the admission points 180 degrees apart, to synchronize with the usual arrangement of tangent arm positions 180 degrees apart for the extreme positions of either disc; but will produce a wipeover on the crank end of the valve (diaphragm port) and less than full opening on the case port, referring to extreme positions in both instances.

As already pointed out, the angles between the crank arm and the axis of valve cover motion when the valve cover is in admission position, in an actual meter, (one such angle being shown as angle D of Fig. 1) will both be nearly equal to an angle corresponding to angle L of diagrammatic Fig. 3. In my co-pending application 291,843 filed August 25, 1939, these angles between crank arm and axis of valve cover motion at admission positions are nearly equal to the angle between lines drawn from extreme positions of flag arm bearing axis to vertical valve crank shaft axis (corresponding to angle C of Fig. 1); and the tangent arm positions corresponding to the ends of one disc stroke make an angle with each other corresponding to angle A of diagrammatic Fig. 3, which angle differs from 180 degrees by the angle B. In the present invention, however, the parts are so arranged and proportioned that angle C is appreciably less than angle D, so that the tangent arm positions corresponding to the ends of either disc stroke make an angle with each other which, if translated to the proportions of diagrammatic Fig. 3 would be closer to 180 degrees than angle A, such as angle E, differing from 180 degrees by angle F plus angle G. The points of admission of the valve cover, for proper synchronization of valve cover and disc movements, are brought to agree with the angle E by a modification of the construction indicated under (Y) above, or alternatively by a modification of the construction indicated under (Z). As a third method, the two foregoing constructions may be combined.

Under a modification of (Y), the width of the diaphragm port is made greater than the width of the case port, with a difference sufficient to shift points 63 and 64 to the radii limiting angle E. Under application 238,133 the difference between the widths of diaphragm and case ports is greater, being enough to bring points 63 and 64 to a diameter, as to line 69.

Under a modification of (Z), the wrist is shifted towards the crank arm (or the crank arm lengthened) sufficiently to shift admission points 63 and 64 to the radii limiting angle E. This will produce a wipeover, that is, will expose a portion of the crossbar between ports 13 and 14 at one extreme position of the valve cover; while the case port 12 will be less than fully opened at the other extreme position of the valve cover. In the ordinary meter with compensated setting, a greater shift is used, enough to bring points 63 and 64 to a diameter, as to line 69.

Under a combination of the two foregoing constructions, the points 63 and 64 are shifted to the radii limiting angle E partly by a difference in the widths of case and diaphragm ports, and partly by shifting the wrist (or lengthening the crank arm).

The three foregoing constructions have advantages over the construction featured in application 291,843, under certain limits and conditions. It may be desirable to increase angle D of Fig. 1, for convenience of design, for instance, or to permit using a valve seat wider in the direction of valve cover motion, such change involving an increase in the diameter of the crank circle, or a decrease in the length of the crank arm, or both together. In such case, to make angle C equal or nearly equal to the increased angle D, as required by application 291,843, might result in inconvenient relations between the lengths and positions of the flag arms and links, and too great a departure from symmetry. The present invention permits the choice of a convenient value for angle C without dependence on the size of angle D, and is therefore advantageous under some requirements of design. The advantages of construction by which lines from the limits of travel of the flag arm bearing axis to the vertical crank shaft axis form an acute angle are described in my co-pending application 291,843; and the present invention, employing a modification of the same principles, has like advantages in respect to reducing fluctuations of outlet pressure at a given speed, and in reducing angularity between links and tangent arm for a given disc stroke.

In further difference from my application 291,843 the present invention shifts the flag rods and the valve crank shaft towards the inlet 6 of the meter, thus increasing the length of the flag, and decreasing the angle of sweep (angle K of Fig. 1) of the flag arms for a given stroke of the disc 19. Thus the disc stroke is further considerably increased without unduly increasing the angularity between the links 33, 34 and the tangent arm 36. This is important, because increase of such angularity increases the irregularity of meter operation. The lengthening of the disc stroke increases the volume of gas delivered per revolution of the meter, by which either increased meter capacity for a given size of case, or slower meter speed at a given delivery per hour, or both together, may be attained.

To secure the increased disc stroke contemplated, a collapsible form of bellows, such as shown in my co-pending application 238,133, filed November 1, 1938, may be used, or any of several well known designs. As the bellows used forms no part of this invention, it is not further detailed.

Another advantage of the present construction over that shown in application 291,843 is that the axes of valve cover motion are set at an acute angle, with a separate crank for driving each valve cover, instead of the usual arrangement employed in the application mentioned, in which a single crank drives two valve covers with axes at right angles. The present construction allows the valves to be positioned close to the outlet 18, thus avoiding interference between the fork channel branches 16 and the bellows 5 (or an increase in the height of the meter to eliminate such interference) and permitting the use of a shorter fork channel 17. It will be seen that if the axes of valve cover motion, passing through the valve crank shaft axis, were disposed at right angles as usual, the valves would have to be set further from the outlet 18, with the disadvantages mentioned. The upper crank bearing 70 (Fig. 2) is made smaller than the lower crank bearing 71, so that the lower crank arm 42 may be slipped over the upper crank bearing in assembling.

In order to permit higher speed than ordinary in meter operation without undue wear and frictional resistance, I have installed at several points, as detailed below, balls fastened to the ends of moving shafts, with cooperating bearings. Balls of appropriate hardness, dimensional accuracy, and resistance to gas corrosion, are available commercially at moderate prices. Bearings containing multiple loose balls or rollers, and single loose balls at the ends of shafts, have been applied in the prior art, but the present construction of a single ball fast to the shaft is cheaper than the multiple bearings, and provides shaft guidance at right angles to the shaft axis, which the loose ball of itself does not. Moreover, my construction includes bearings so designed that what wear takes place is in a vertical direction, the assembly being capable of considerable vertical wear without producing appreciable looseness at right angles to the shaft axis. In the flag rod bearing 29 of Fig. 2, and in the rock shaft bearings 72 of Fig. 2 or 96 of Fig. 9, wear at right angles to the shaft axis permits the disc to make a longer stroke than was set in the calibration of the meter, thus affecting meter accuracy; while wear at right angles to the shaft axis in the valve crank bearing 73 (Fig. 2) disturbs the synchronism of valve cover movement and disc travel, thus affecting both meter accuracy and smoothness of operation. On the other hand, vertical wear alone, in the direction of the shaft axis, may take place at these points within considerable limits without affecting accuracy or smoothness of operation.

Three types of bearings to attain this result are shown by way of example in Figs. 4, 5, and 6 respectively. In Fig. 4, the ball 74 fast to the shaft 75 is in contact with the bearing 76 over a considerable part of the ball surface lower than its horizontal circumference, but is clear of the bearing surface at a depression 77 at the bottom. This depression relieves the ball of support at a dead point, thus promoting vertical wear as against horizontal; allows a place for the collection of metallic grains arising from wear, and minimizes the action of such grains as abrasives; and serves as a lubricant reservoir if desired. In Fig. 5, the ball 78 fast to the shaft 79 is in contact with a conical bearing surface 80 in bearing 81. In Fig. 6, the ball 82 fast to the shaft 83 is in contact with two conical bearing surfaces of different slope, 84 and 85 in bearing 86. In both Figs. 5 and 6, depressions 87 and 88 respectively are provided, so that if either bearing through long continued wear degenerates into the form shown in Fig. 4, the depression will still serve the desired purpose.

The surfaces of the bearings may be prepared to receive the balls by pressure or impact from a suitably hardened ball of about the same diameter as the operating balls; or by contact with such a ball rotating on a spindle.

In comparison with the usual construction, in which the end of the shaft is turned to a hemispherical contour, and rotates in a cast or turned bearing, my construction provides at a moderate extra cost a shaft end harder, more accurate dimensionally, and more resistant to gas corrosion; and a bearing more accurate, and adapted to prevent undesirable wear. These considerations, together with the fact that the ball diameter may be chosen close to the diameter of the shaft, make for very much less frictional resistance as compared to the ordinary construction.

As mentioned, my construction is applied to the end of the flag rod 23 and to the flag rod bearing 29 (Fig. 2); to the end of the valve crank shaft 38 and to the valve crank shaft bearing 73; and to the rock shaft 21 at its upper end, in conjunction with the upper rock shaft bearing 72 and the flag carriage 20. This flag carriage is more plainly shown in Figs. 7 and 8, in which 89 is a U shaped bracket fastened to the disc 19 on the central portion of the bracket, and carrying in its horizontal legs the upper rock shaft bearing 72 and the lower rock shaft bearing 90. For extra strength and stiffness, a tension member is added, which may be in the form of a rectangle of tinned wire forced over the legs of the bracket and soldered in place. The upper rock shaft bearing 72 is fast in a hole in the upper leg of the bracket 89, and the lower rock shaft bearing 90 is forced into an opening 92 in the lower leg, and there fastened. The upper and lower plates, 93 and 94, of the flag 22 (Figs. 2 and 7) are fast to the rock shaft 21.

In the alternative form of rock shaft, flag, and flag carriage shown in Fig. 9, the ball is fastened at the bottom of the rock shaft 95, resting in the lower rock shaft bearing 96, which bearing is fastened in a hole in the lower plate 94a of the flag. An opening 92a in the upper plate 93a of the flag receives the upper rock shaft bearing 97, forced into the opening and there fastened. A U shaped bracket 98 is fast to the rock shaft 95 and to the disc 19. A member corresponding to 91 of Fig. 7 is not needed in this construction, as the horizontal legs of the bracket are rigidly connected by the rock shaft 95 itself.

In both these constructions, the flag carriage may be unsoldered from the disc 19 without damage to any part, when replacement of the disc is necessary. Both constructions are inexpensive, and light in relation to their strength and stiffness.

My improved stuffing box may be used for both the crank stuffing box 40 and the flag stuffing box 30. Referring to Fig. 10, the body 99 has a threaded cap 100, and a gas tight joint for the shaft 101 passing through the stuffing box is provided by a packing member 102, made of resilient material capable of withstanding the action of gas. The outer cylindrical surface 103 of the packing member 102 is tight in the body 99, and the inner cylindrical surface 104 is tight enough on the shaft 101 to prevent the leakage of gas, but loose enough to allow turning of the shaft without undue friction. An annular cavity 105 is under gas pressure through the opening 106 in the body 99, which tends to increase the sealing pressure between surface 104 and the shaft 101 when the gas pressure increases.

Turning now to the features of my invention intended to reduce the weight of moving parts, with consideration also of the light flag carriages already described, it should be noted that the total kinetic energy of the moving parts of a meter varies from instant to instant over a complete revolution of the meter, from the inherent conditions of the mechanism by which motion is transmitted from the bellows to the valves, including the angularities of the various crank members. The effect of alternately adding to and subtracting from the total kinetic energy of the moving parts, even when demand for gas is constant, results in fluctuations in outlet pressure and increased bearing wear. A like disadvantageous result, though of less frequent occurrence, arises from the inertia of the movable parts when the gas is turned on, or demand increased or decreased.

From these considerations it follows that it will be of advantage to make the moving parts as light as possible consistent with the desired strength and stiffness, and with practicable cost, especially if it is intended to increase meter speed considerably, as contemplated generally in this invention; for the unfavorable effects mentioned as arising from the weight of moving parts are accentuated as the meter speed increases. In a foregoing paragraph it was pointed out that the flag carriage constructions featured were light for their strength and stiffness, and I now proceed to describe the flag arms, links, crank arms, and flag in respect to the same quality.

The flag arms 31 and 32 are provided with a substantially vertical flange at each longitudinal edge, making them of U shaped cross section as indicated in Figs. 1 and 14. If made of cast or formed material, the horizontal width of the flag arms decreases from the flag rod end, so as to distribute the metal most efficiently against the horizontal thrust which they carry. If rolled or drawn to section, the horizontal width will be constant over the entire length of the flag arm. The provision of flanges restrains the tendency of the flag arm to twist about its axis under the horizontal load, and lightens the flag arm for a given stiffness as compared to flag arms of the ordinary rectangular cross section.

The links 33, 34 are lightened, for a given stiffness against thrust, by forming them of tubing. This tubing may be commercial tubing of continuous cross section, or may be formed to a circular or other cross section from sheet metal. The ends of the links 33, 34 are flattened to receive bushings, 107, 108 (Figs. 2 and 13) for link 34, and similar bushings are installed in link 33. The use of bushings makes it practicable to use the best available metal, as to wear and resistance to corrosion, for the bearing surfaces, using a less expensive metal for the rest of the link; thereby giving a cheaper construction than if the link were made of one metal as usual.

The crank arms 41 and 42 (Figs. 1 and 2) are constructed generally like the links 33, 34, and have like advantages.

The provision of bushings of special metal in the links and crank arms will reduce wear under high speed meter operation, so that these two features have that advantage (supplementing the advantages hereinbefore claimed for my flag rod, valve crank shaft, and rock shaft constructions) as well as the advantage of reduced weight for a given stiffness.

The flag 22 includes plates 93 and 94 decreasing in horizontal width from the flag rod end, so as to distribute the metal most efficiently in regard to stiffness, similar to the conditions of a cantilever beam of uniform strength. If these plates are made of metal so thin that they cannot bear the weight of the disc 19, bellows 5, and flag carriage 20 unaided, or have a tendency to twist on their axes under the horizontal thrust of the disc, a spacer 109 is installed between them, fastened in place by solder or otherwise.

In the construction shown in Figs. 2 and 11, non-circular bushings 110, 111, are fastened in the plates 93, 94, and fixed to the flag rod 23 by set screws 112, 113 or otherwise. In the alternative construction shown in Fig. 12, particularly applicable when the plates 93, 94 are too thin to give proper seating to non-circular bushings, pins 114, of metal having a high strength against shear, pass through holes in the flag rod 23, and are fastened to the plates 93, 94 by solder or otherwise.

In the constructions shown in Figs. 2, 11, and 12, the ends of the plates 93, 94 are fast to the rock shaft 21. In the construction shown in Fig. 9, the upper and lower plates of the flag, 93—a and 94—a, carry upper and lower rock shaft bearings 97 and 96 respectively, in which the rock shaft, marked 95 in Fig. 9, is supported and journalled. Plate 93—a has an opening 92—a similar to opening 92 of Fig. 8 for convenience in assembly. Rock shaft 95 has a ball fast to its lower end, and rock shaft 21 a ball fast to its upper end, as previously explained.

The kingpost 39 (Figs. 1 and 2) is formed of sheet metal, with a horizontal portion of U shaped cross section carrying a bushing 115 in which the valve crank shaft 38 is journalled, and a vertical portion of U shaped cross section, in which the flanges of the U increase in width to the base of the kingpost as shown. By this construction, a broad, firm base is provided, the valve crank shaft is held rigidly against horizontal displacement, and clearance is provided, by the slope of the edge of the portion 116 joining the horizontal and vertical portions, for the rotation of the tangent arm 36, with but a small space between bushing 115 and the tangent arm. This construction reduces meter height slightly as against the ordinary kingpost, in which greater space is necessary between tangent arm and kingpost bearing because the horizontal portion of the kingpost joins the vertical portion at a right angle instead of with a sloped portion as in my construction.

This improved kingpost, as compared to the ordinary kingpost made of one metal, offers the same advantages in respect to a high quality bushing set in a frame of cheaper metal as claimed in the foregoing description of links 33, 34.

While I have shown and described my invention in connection with a gas meter of a specific type, certain of the features can obviously be used with other kinds of meters within the scope of the appended claims.

Having thus described my invention, I claim:

1. In a gas meter, a pair of bellows; slide valves, comprising valve covers, and valve seats with case and diaphragm ports of unequal width, for controlling flow of gas into and out of the bellows; mechanism deriving movement from the bellows for actuating the valves, including a valve crank shaft, a tangent arm on the shaft, front and rear flag rods, front and rear flag arms on the rods connected to the tangent arm by links, and crank arms connecting the valve crank shaft with the valve covers, such that lines drawn from the valve crank shaft axis to the extreme positions of the flag arm bearing axes respectively form acute angles, said acute angles being substantially less than the angles between a crank arm and the corresponding axis of valve cover motion when the valve cover is in admission positions: whereby synchronism of the movements of bellows and valves is produced.

2. A gas meter as in claim 1, in which the arcs of motion of the flag arm bearing axes included within said acute angles are respectively concave and convex when viewed from the position of the valve crank shaft.

3. In a gas meter, a pair of bellows; slide valves, comprising valve covers and valve seats, each seat having outer ports of unequal width and having a center port separated from the outer ports by crossbars, for controlling flow of gas into and out of the bellows; mechanism deriving movement from the bellows for actuating the valves, including a valve crank shaft, a tangent arm on the shaft, front and rear flag rods, front and rear flag arms on the rods connected to the tangent arm by links, and crank arms connecting the valve crank shaft with the valve covers, such that lines drawn from the valve crank shaft axis to the extreme positions of the flag arm bearing axes respectively form acute angles, said acute angles being substantially less than the angles between a crank arm and the corresponding axis of valve cover motion when the valve cover is in admission positions, the crossbar between one outer port and the center port in each valve seat being partly exposed at one extreme position of the valve cover, and the other outer port in the same valve seat being less than fully opened at the other extreme position of the valve cover: whereby synchronism of the movements of bellows and valves is produced.

4. A gas meter as in claim 3, in which the arcs of motion of the flag arm bearing axes included within said acute angles are respectively concave and convex when viewed from the position of the valve crank shaft.

5. In a gas meter, a pair of bellows; slide valves, comprising valve covers and valve seats, each seat having outer ports and a center port separated from the outer ports by crossbars, for controlling flow of gas into and out of the bellows; mechanism deriving movement from the bellows for actuating the valves, including a valve crank shaft, a tangent arm on the shaft, front and rear flag rods, front and rear flag arms on the rods connected to the tangent arm by links, and crank arms connecting the valve crank shaft with the valve covers, such that lines drawn from the valve shaft axis to the extreme positions of the flag arm bearing axes respectively form acute angles, said acute angles being substantially less than the angles between a crank arm and the corresponding axis of valve cover motion when the valve cover is in admission positions, the crossbar between one outer port and the center port in each valve seat being partly exposed at one extreme position of the valve cover, and the other outer port in the same valve seat being less than fully opened at the other extreme position of the valve cover: whereby synchronism of the movements of bellows and valves is produced.

6. A gas meter as in claim 5, in which the arcs of motion of the flag arm bearing axes included within said acute angles are respectively concave and convex when viewed from the position of the valve crank shaft.

7. In a gas meter, a pair of bellows; slide valves, comprising valve covers and valve seats, each seat having outer ports and a center port separated from the outer ports by crossbars, for controlling flow of gas into and out of the bellows; mechanism deriving movement from the bellows for actuating the valves, including a valve crank shaft, a tangent arm on the shaft, front and rear flag rods both on the same side of the bellows axis, front and rear flag arms on the rods connected to the tangent arm by front and rear links, and crank arms connecting the valve crank shaft with the valve covers, such that lines drawn from the valve crank shaft axis to the extreme positions of the flag arm bearing axes respectively form acute angles, said acute angles being substantially less than the angles between a crank arm and the corresponding axis of the valve cover motion when the valve cover is in admission positions, and such that the arcs of motion of the flag arm bearing axes included within said acute angles are respectively concave and convex when viewed from the position of the valve crank shaft: whereby synchronism of the movements of bellows and valves is produced.

8. A gas meter as in claim 7, in which the outer ports in each valve seat are unequal in width.

9. A gas meter as in claim 7, in which the crossbar between one outer port and the center port in each valve seat is partly exposed at one extreme position of the valve cover, and the other outer port in the same valve seat is less than fully opened at the other extreme position of the valve cover.

10. A gas meter as in claim 7, in which the outer ports in each valve seat are unequal in width, and in which the crossbar between one outer port and the center port in each valve seat is partly exposed at one extreme position of the valve cover, and the other outer port in the same valve seat is less than fully opened at the other extreme position of the valve cover.

11. A gas meter as in claim 7, in which the front and rear links are of unequal lengths.

12. A gas meter as in claim 7, in which the valve crank shaft has plural cranks.

13. A gas meter as in claim 7, in which the valve crank shaft has plural cranks, said cranks being of different diameters to facilitate assembly of the crank arms.

14. A gas meter as in claim 7, in which the axes of valve cover motion are in acute angular relation.

15. A gas meter as in claim 7, in which the crankshaft axis is on one side of the bellows axis and the flag rods are further remote from the bellows axis than the valve crank shaft, and on the same side of said axis as said shaft.

16. In a gas meter, a pair of bellows; valves for controlling flow of gas into and out of the bellows; mechanism deriving movement from the bellows for actuating the valves, including a vertical shaft, said shaft having a separate ball secured to one end; and an open socket bearing for the ball, the axes of said shaft and said bearing coinciding at all positions of motion, and said bearing being out of contact with said ball on and in the region of said axes.

17. A gas meter as in claim 16, in which the bearing surface of the bearing is hemispherical except for a depression coaxial with the shaft.

18. A gas meter as in claim 16, in which the bearing surface of the bearing is conical.

19. A gas meter as in claim 16, in which the bearing has two conical bearing surfaces of differing slopes.

20. In a gas meter, a pair of bellows; valves for controlling flow of gas into and out of the bellows; mechanism deriving movement from the bellows for actuating the valves, including a rock shaft, said rock shaft having a separate ball secured to one end; and an open socket bearing for the ball, the axes of said rock shaft and said bearing coinciding at all positions of motion, and said bearing being out of contact with said ball on and in the region of said axes.

21. A gas meter as in claim 20, having a flag carriage which includes a U shaped bracket to which said socket bearing is fastened.

22. A gas meter as in claim 20, having a U shaped flag carriage, the legs of said flag carriage being fast to the rock shaft.

23. A gas meter as in claim 20, having a flag to which said socket bearing is fastened.

24. In a gas meter, a flag connecting a flag rod and a rock shaft, said flag including spaced plural plates increasing in width from their rock shaft ends to their flag rod ends, and affixed to the flag rod by pins passing through the flag rod, said pins being fastened to the plates.

WILLIAM LAIRD BROWN.